Figure 1:
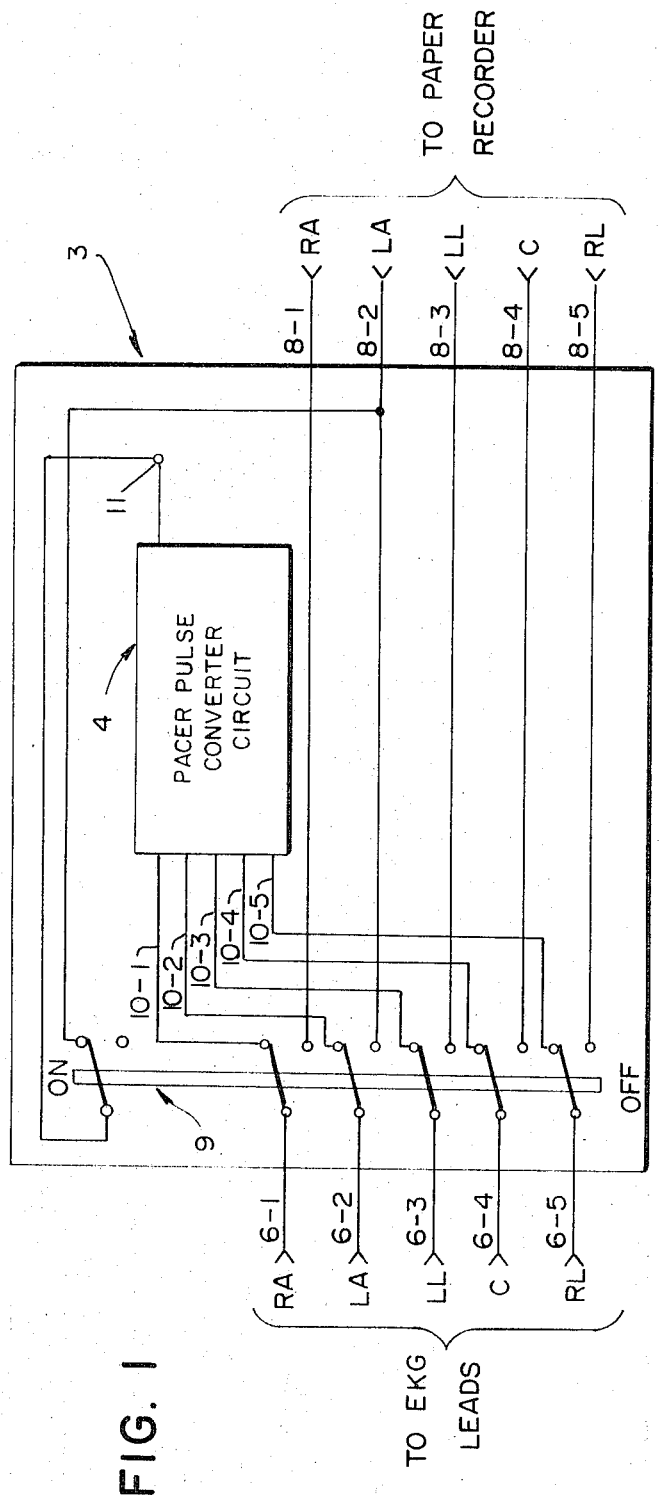

United States Patent [19]

Day

[11] 3,871,363
[45] Mar. 18, 1975

[54] PACER DIAGNOSTIC INSTRUMENT
[75] Inventor: Christopher C. Day, Newtonville, Mass.
[73] Assignee: American Optical Corporation, Southbridge, Mass.
[22] Filed: Dec. 19, 1973
[21] Appl. No.: 426,407

[52] U.S. Cl. ...... 128/2.06 R, 128/419 PT, 307/267, 328/58
[51] Int. Cl. .............................................. A61b 5/04
[58] Field of Search ..... 128/2.05 R, 2.06 B, 2.06 G, 128/2.06 R, 419 P; 307/267; 324/188; 328/58, 69, 18 C

[56] References Cited
UNITED STATES PATENTS
| | | | |
|---|---|---|---|
| 2,400,583 | 3/1946 | White | 128/2.06 B |
| 3,222,598 | 12/1965 | Pollard | 128/2.06 R |
| 3,263,090 | 7/1966 | Blocher, Jr. | 328/58 |
| 3,473,050 | 10/1969 | Groom | 328/58 |

OTHER PUBLICATIONS
Green et al., "Medical and Biological Engineering," Vol. 9, No. 5, Sept., 1971, pp. 503–508.

Primary Examiner—William E. Kamm

[57] ABSTRACT

There is disclosed a device for connection between a set of EKG leads and a conventional EKG paper recorder. When the device is turned "off" the EKG leads are coupled directly to the recorder inputs, and a conventional paper trace may be made. But when the device is turned "on," what is delivered to one of the recorder inputs is a series of pulses, one for each pacer pulse which appears in the EKG waveform. Each pulse delivered to the recorder has a width which is directly proportional to the width of the respective pacer pulse, but is greatly extended in scale. By observing the recorded pulses, the pacer pulse width can be determined.

7 Claims, 2 Drawing Figures

PATENTED MAR 18 1975 3,871,363

PACER DIAGNOSTIC INSTRUMENT

This invention relates to pacer diagnostic instruments, and more particularly to a device which accomplishes the measurement of a pacer pulse width with the use of conventional instruments normally used for other purposes, such as EKG paper recorders and cardiac monitors (together referred to herein as recorders).

In the EKG signal of a patient equipped with a pacer, the pacer pulse usually appears prior to QRS waveforms in the overall signal. The pacer pulse is usually of large amplitude and very small width. It is often necessary to determine the width of the pulse since it may be indicative of the state of the pacer, and it is one of the factors which determine the need to replace the pacer. It is very difficult, however, to determine the width of the pulse; conventional monitors, for example, do not have a sufficient bandwidth to pass the pacer pulse with any reasonable degree of fidelity. The speed of both conventional physiological monitors and paper recorders are such that the narrow-width pacer pulse (typically, 0.5–4 milliseconds) cannot be determined, that is, the leading and trailing edges of the pulse cannot be readily distinguished.

It is a general object of my invention to provide a unit, preferably, battery operated, which can be inserted between the EKG leads from the patient and a conventional monitor or recorder, for enabling the monitor or recorder to be used for accurately measuring the pacer pulse width.

Briefly, in accordance with the principles of my invention, when the unit is turned "off" the EKG leads from the patient are connected to the input leads of the monitor or recorder in the conventional way, and the EKG signal is monitored or recorded as is known in the art. But when the unit is turned "on," the EKG signal is not transmitted to the monitor or recorder. Instead, each pacer pulse which is contained in the signal is operated upon to the exclusion of the rest of the signal. The output of the unit, which is extended to the monitor or recorder, is simply a pulse — on an expanded time scale — whose width is directly proportional to the width of the pacer pulse by a predetermined factor, e.g., by a factor of 200. In this way, what appears on the monitor, or on a paper trace, is a series of pulses whose widths can be interpreted to determine the widths of the pacer pulses.

Figure 2:
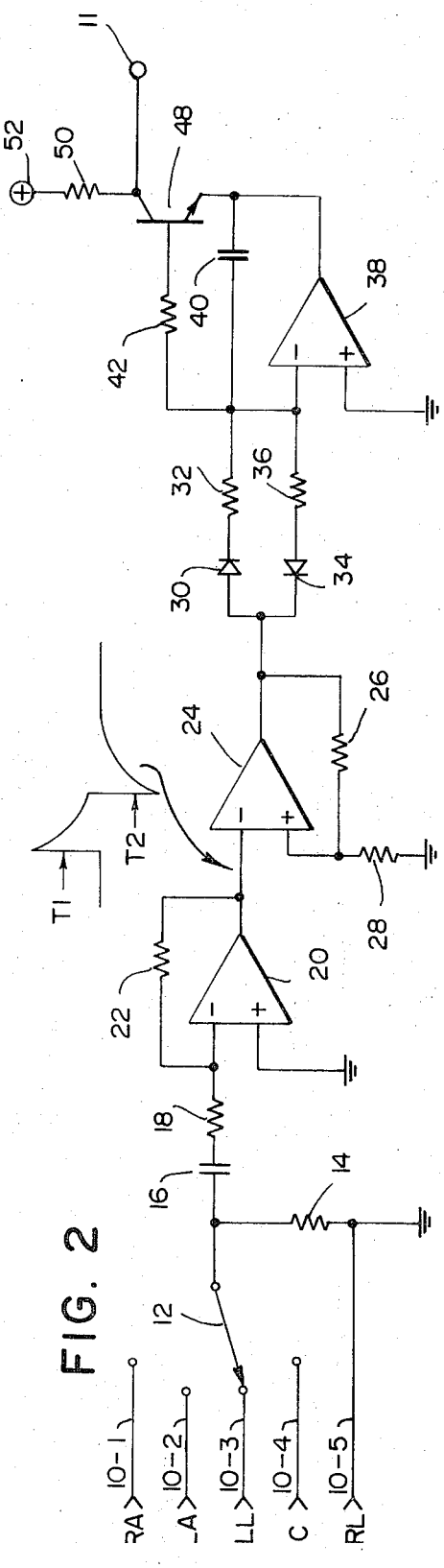

Further objects, features and advantages of my invention will become apparent upon consideration of the following detailed description in conjunction with the drawing, in which:

FIG. 1 depicts the manner in which the unit of my invention, shown by the numeral 3, is connected between a set of EKG leads and the input leads to a paper recorder; and FIG. 2 depicts schematically the circuitry shown as a block in FIG. 1 and depicted by the numeral 4.

As shown in FIG. 1, a conventional set of EKG leads consists of five conductors, designated 6–1 through 6–5 in the drawing. Typically, these conductors contain thereon signals derived from various points on the skin of the patient, namely, right arm, left arm, left leg, chest and right leg. These five signal sources are designated in FIG. 1 by the letters RA, LA, LL, C and RL. A similar set of five leads, shown by the numerals 8–1 through 8–5, is extended to a conventional physiological monitor or paper recorder (a paper recorder being shown in FIG. 1 for illustrative purposes). The paper recorder usually includes a switch for selecting the signal on one of the leads to be recorded. Usually the right leg (RL) lead is grounded, and the signal on one of the other four leads is recorded. In the usual system organization, the paper recorder has an input jack into which a cable containing the EKG leads is inserted. In accordance with the principles of my invention, I provide a unit shown by the numeral 3 for interfacing the EKG leads to the recorder. The unit includes a jack at its left side (not shown) into which the cable containing the five EKG leads can be inserted. The unit is also provided with a cable on its right side (not shown) for insertion into the jack of the paper recorder for extending five leads (8–1 through 8–5) to the recorder.

The instrument includes six ganged switches depicted by the numeral 9. When the switch is in the off position (the position not shown in the drawing) the five EKG leads 6–1 through 6–5 are extended directly to the five recorder leads 8–1 through 8–5, and the five input leads 10–1 through 10–5 of circuit 4, as well as output terminal 11, are disconnected from the overall circuit. The unit is thus "transparent"; the EKG signals are extended to the recorder in the usual manner. When the switch is in the on position, the five EKG leads are disconnected from the five paper recorder leads. Instead, each of the input leads is connected to a respective one of conductors 10–1 through 10–5, and output terminal 11 of circuit 4 is connected via the sixth pair of contacts on switch 9 to conductor 8-2. Circuit 4 operates to examine the EKG signal on a selected one of the EKG leads and to apply a series of pulses on conductor 8-2 which is extended to the paper recorder. If the paper recorder is now set so that it is the signal on the LA input which is recorded, the physician can determine the width of each pacer pulse by inspecting the width of the corresponding recorded pulse. (The connection of output terminal 11 from circuit 4 to the LA recorder input is arbitrary; output terminal 11 could be connected to one of the other recorder inputs in which case the signal on this conductor would have to be examined in order to determine the widths of the pacer pulses.)

The circuitry included in block of FIG. 1 is shown in FIG. 2. At the left side of the circuit, there are shown the five input leads 10–1 through 10–5. At the right side of the circuit there is shown output terminal 11. The circuit is preferably powered by battery 52, although an AC source (with an appropriate DC supply) could be used.

Input lead 10–5 is grounded, since it is usually the RL lead to the paper recorder which is grounded. The other four input leads are connected to four terminals of selector switch 12 so that a selected one of the four EKG input signals can be examined. All three operational amplifiers 20, 24 and 38 serve to invert signals applied to their inputs, and consequently, as will become apparent below, for a positive pulse to appear at output terminal 11 it is a negative pacer pulse which must be operated upon. Selector switch 12 is moved to a position such that negative QRS waveforms (and pacer pulses) appear at the selector switch.

The input signal appears across resistor 14, and capacitor 16 is provided to eliminate any DC offset. Operational amplifier 20 is provided with a feedback resistor 22. Together with capacitor 16 and resistor 18, the operational amplifier functions as a differentiator and also attenuates the EKG signal. Consequently, the waveform at the output of operational amplifier 20 consists primarily of a differentiated pacer pulse as shown in the drawing. The differentiated pulse is, of course, very narrow, and its edges are the same time spacing as that of the pacer pulse. Although the width of a pacer pulse usually varies between 0.5 and 4 milliseconds, in accordance with current practice a pacer pulse does not usually exceed 2 milliseconds.

Operational amplifier 24, together with resistors 26 and 28, serves as a Schmitt trigger. It has two threshold levels, which threshold levels are designated T1 and T2 with reference to the waveform depicted at the output of amplifier 20. Whenever the output of amplifier 20 rises above level T1, the output of amplifier 24 goes negative. whenever the output of amplifier 20 drops below level T2, the output of amplifier 24 goes positive. In each case, the output of operational amplifier 24 is saturated and remains fixed until the output switches once again. The magnitudes of the two output levels are equal.

The combined function of amplifiers 20 and 24 is to provide a voltage at the output of amplifier 24 which switches between two levels at the leading and trailing edges of each pacer pulse. Amplifier 20 is arranged in a differentiator configuration to attenuate the EKG waveform and to raise the signal levels of each pacer pulse above threshold T1 and below threshold T2. The Schmitt trigger serves to reject noise and also to provide a fixed amplitude output pulse (negative) whose width is equal to the pacer pulse width.

Operational amplifier 38 is provided with a feedback capacitor 40 so that it serves as an integrator. Initially, the output of the amplifier is held fixed at a low level. At the leading edge of each pacer pulse, the output of the amplifier increases linearly in the form of a ramp, as will be described below. At the termination of the pacer pulse, the output of the amplifier starts to decrease linearly in the form of a ramp. However, the rate at which the output decreases is much slower than the rate at which it increases. Consequently, the output of the amplifier does not reach the initial low level until long after the pacer pulse has terminated (but prior to the next pacer pulse). As will be described below, a pulse appears at output terminal 11 approximately from the time that the output of amplifier 38 starts to increase until approximately the time that it once again reaches its quiescent low level.

When the output of amplifier 24 first goes negative, at the leading edge of a pacer pulse, a negative step is applied through diode 34 and resistor 36 to the minus input of amplifier 38. Because of the provision of feedback capacitor 40, the amplifier functions as an integrator and its output increases linearly. The capacitor charges from a voltage source whose magnitude is equal to the output of amplifier 24, less the drop across diode 34. The capacitor voltage thus increases at a rate proportional to $(|V_{sat}|-V_D)/C_{40}R_{36}$, where $V_{sat}$ is the negative saturated voltage output of amplifier 24, $V_D$ is the drop across diode 34, $C_{40}$ is the magnitude of capacitor 40 and $R_{36}$ is the magnitude of resistor 36. At the trailing edge of the pacer pulse, the output of amplifier 24 switches from $-V_{sat}$ to $+V_{sat}$; the driving source for the integrator is now positive rather than negative, and diode 30 conducts rather than diode 34. The voltage across capacitor 40 now starts to decrease at a rate proportional to $(|V_{sat}|-V_D)/C_{40}R_{32})$, where $V_D$ is the drop across diode 30 and $R_{32}$ is the magnitude of resistor 32.

The significant point is that the voltage at the output of amplifier 38 takes a longer time to fall to the quiescent level following the trailing edge of the pacer pulse than it does to reach the maximum level (which is attained at the termination of the pacer pulse). That is, the falling ramp rate is much slower than the rising ramp rate. In fact, the ratio of the time taken for the output voltage to drop down to the quiescent level to the time taken for it to rise to the maximum level is equal to the ratio of the two impedances $R_{36}$ and $R_{32}$. Consequently, if it requires T seconds for the ramp to rise, it requires $(R_{32}/R_{36})T$ seconds for the ramp to fall, and the total time required for both ramps is $T(1+R_{32}/R_{36})$. If the resistance ratio is 199, then the total period for the two ramps is 200 times the pacer pulse width.

In the quiescent state, after the output of amplifier 38 has returned to the minimum level, current flows through diode 30, resistor 32, resistor 42, and the base-emitter junction of transistor 48 into the output of amplifier 38 (which is a virtual ground). The capacitor voltage remains fixed at a level sufficient to forward bias the base-emitter junction of transistor 48, and the output of amplifier 38 remains slightly negative. Thus, in the quiescent state the transistor is on and current flows from battery 52 through resistor 50 and the transistor to ground. Terminal 11 is thus held near ground potential. But as soon as the output of amplifier 24 switches to a negative potential level, the voltage across capacitor 40 starts to increase. Within only a fraction of a millisecond, transistor 48 turns off, and the potential at terminal 11 jumps to the potential of source 52. It is only after 200T seconds have elapsed that the output of amplifier 38 falls to the quiescent level and transistor 48 turns on once again. Consequently, for each pacer pulse, a positive pulse appears at terminal 11 whose duration is 200 times the duration of the pacer pulse. It is this pulse which is recorded.

A typical paper speed is 25 mm/second. If a pacer pulse has a duration of only 1 millisecond, the paper moves only 0.025 mm during this time interval. But because the pulse which is recorded is 200 times as long as the pacer pulse, the width of the pulse on the paper is 5 mm. A pulse of this duration can be read easily on a paper trace. Of course, the scale factor 200 is merely illustrative, and any convenient scale factor can be selected depending upon the ratio of the magnitudes of resistors 32 and 36. It is preferable that the scale factor be chosen such that the maximum duration of a pulse at terminal 11 be less than the shortest time period between pacer pulses. In this way, one pulse can be recorded on the paper trace for each pacer pulse. If a greater time scale factor is desired, it can be selected but in this case it may be necessary to operate upon only every other pacer pulse. Alternatively, amplifier 20 could be disabled as long as transistor 48 is off; the provision of such a feedback circuit would simply prevent another pacer pulse from being operated upon until the measurement in progress if fully recorded.

Although the invention has been described with reference to a particular embodiment; it is to be understood that this embodiment is only illustrative of the application of the principles of the invention. Numerous modifications may be made therein and other arranngements may be devised without departing from the spirit and scope of the invention.

What I claim is:

1. A device interconnected between the source of an EKG signal and an instrument for permanently recording an EKG signal, the device serving to operate upon pacer pulses contained in the EKG signal for converting said pulses to a form suitable for recording by said recording instrument, comprising means for receiving said EKG signal and said pacer pulses, means for substantially attenuating said EKG signal and not said pacer pulses, means for detecting the leading and trailing edges of a pacer pulse, trigger means operative in response to said detector means for providing a rectangular pulse equal in width to said pacer pulse, integrator means operative in response to said trigger means for integrating said rectangular pulse, said integrator means including means for generating both a ramp signal in one direction from the time that said leading edge of said pacer pulse is detected until the time that said trailing edge of said pacer pulse is detected and a second ramp signal in the opposite direction following the detection of said trailing edge, means responsive to said integrator means for generating a wide pulse whose width is a greater-than-unity predetermined multiple of the time interval between said leading edge and said trailing edge, means for controlling the rate of said second ramp signal to be substantially slower than the rate of said first ramp signal by a predetermined factor, means for governing the duration of said wide pulse to be co-extensive with the duration of both of said ramp signals, and means for transmitting said EKG signal and said wide pulse mutually exclusively to said instrument.

2. A device in accordance with claim 1 wherein said leading and trailing edge detecting means includes means for differentiating an EKG signal and the pacer pulses contained therein, and means for detecting the leading and trailing edges of differentiated pacer pulses.

3. A device in accordance with claim 2 further including means for selectively inhibiting operations on said one of the EKG signal types and means for transmitting said one of the signal types with no distortion from said EKG signal source to said recording instrument.

4. A device in accordance with claim 3 wherein said EKG signal source furnishes a plurality of different types of EKG signals from the same patient, and further including means for selecting one of the EKG signal types for operations thereon.

5. A device in accordance with claim 1 wherein said EKG signal source furnishes a plurality of different types of EKG signals from the same patient, and further including means for selecting one of the EKG signal types for operations thereon.

6. A device in accordance with claim 5 further including means for selectively inhibiting operations on said one of the EKG signal types and means for transmitting said one of the signal types with no distortion from said EKG signal source to said recording instrument.

7. A device in accordance with claim 1 further including means for selectively inhibiting operations on EKG signals such that such signals are transmitted with no distortion from said EKG signal source to said recording instrument.

* * * * *